(12) United States Patent
Tardif

(10) Patent No.: US 9,244,156 B1
(45) Date of Patent: Jan. 26, 2016

(54) ORTHOGONAL POLARIZATION SIGNAL AGNOSTIC MATCHED FILTER

(71) Applicant: BAE SYSTEMS Information And Electronic Systems Integration Inc., Nashua, NH (US)

(72) Inventor: Arthur J. Tardif, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 378 days.

(21) Appl. No.: 13/904,408

(22) Filed: May 29, 2013

Related U.S. Application Data

(63) Continuation-in-part of application No. 13/762,493, filed on Feb. 8, 2013.

(60) Provisional application No. 61/596,263, filed on Feb. 8, 2012.

(51) Int. Cl.
*G01S 7/521* (2006.01)
*G01S 7/02* (2006.01)
*G01S 5/02* (2010.01)

(52) U.S. Cl.
CPC ............... *G01S 7/021* (2013.01); *G01S 5/0221* (2013.01)

(58) Field of Classification Search
CPC ............................... G01S 7/021; G01S 5/0221
USPC .................................... 342/20, 192–194, 196
See application file for complete search history.

(56) References Cited

U.S. PATENT DOCUMENTS

| | | | | |
|---|---|---|---|---|
| 5,991,332 A | * | 11/1999 | Lomp | H04B 1/707 375/152 |
| 7,236,901 B2 | | 6/2007 | Huggett | |
| 7,358,887 B2 | * | 4/2008 | Gounalis | G01S 7/021 342/13 |
| 7,450,051 B1 | * | 11/2008 | Valentine | G01S 7/022 342/115 |
| 8,138,969 B2 | | 3/2012 | Huggett et al. | |
| 2006/0269027 A1 | * | 11/2006 | Beadle | H04L 7/027 375/354 |
| 2010/0279707 A1 | * | 11/2010 | Fischer | G01S 5/021 455/456.1 |
| 2010/0283659 A1 | | 11/2010 | Huggett | |
| 2011/0150053 A1 | * | 6/2011 | Kim | G01S 7/021 375/219 |
| 2013/0157599 A1 | | 6/2013 | Ray et al. | |

\* cited by examiner

*Primary Examiner* — John B Sotomayor
*Assistant Examiner* — Marcus Windrich
(74) *Attorney, Agent, or Firm* — Sand & Sebolt

(57) ABSTRACT

A system and method for detecting unknown signals that may be radar pulses is presented. The method includes conjugate multiplying a first signal with a second signal to produce a first multiplied signal and conjugate multiplying the second signal with a third signal to produce a second multiplied signal. The first and second signals are orthogonal and the second and third signals are orthogonal. The radar pulse is contained in all three signals but each signal has noise components. The first multiplied signal is integrated to produce a first integrated signal and the second multiplied signal is integrated to produce a second integrated signal. The first and second integrated signals are summed to produce a summed signal. A location of a peak power of the summed signal is then detected. A TOA of the of the radar pulse is then detected based on the location of the peak power.

20 Claims, 9 Drawing Sheets

ORTHOGONAL POLARIZATION SIGNAL AGNOSTIC MATCHED FILTER

CROSS-REFERENCE TO RELATED APPLICATIONS

This application is a continuation in part application that claims priority from U.S. patent application Ser. No. 13/762,493, filed Feb. 8, 2013 and issued as U.S. Pat. No. 9,157,985, which claims priority from U.S. Provisional Application Ser. No. 61/596,263, filed Feb. 8, 2012; the disclosures of which are incorporated herein by reference.

BACKGROUND OF THE INVENTION

1. Field of Invention

The current invention relates generally to apparatus, systems and methods for detecting radar. More particularly, the apparatus, systems and methods relate to detecting low power spread spectrum radars. Specifically, the apparatus, systems and methods provide for detecting low power spread spectrum radars by analysing the same signal received by two orthogonal radio frequency inputs.

2. Description of Related Art

Modern spread spectrum radars are significantly more difficult to detect and characterize than the conventional Radar. One reason for this is because the transmit power is reduced from typically 4000 watts to under 100 watts. In addition to reduced transmit power, these radars use modulation waveforms that spread the RF energy over a broad spectrum. The combination of reduced transmit power and spread spectrum make these radars extremely difficult to detect. Significant additional processing gain over state of the art radar warning receivers may be needed. In addition to detection, signal parameter estimation may be especially challenging. Some radar detectors support coarse frequency and time of arrival (TOA) measurements based on the channelizer bin detection and the filtered pulse envelope. However to detect spread spectrum radars accurately, more resolution on both of these measurements is needed.

Other conventional techniques extract the phase time history of the signal and fit a straight line to the phase data. The slope of the phase line is the frequency. Various algorithms approach the Cramer Rao Lower Bound at signal to noise ratios higher than 6 dB. However, modern radars may need to look at a range of SNRs from −5 dB to +10 dB. A need, therefore, exists for a better radar (unknown signal) detector.

SUMMARY

According to the present invention orthogonal polarization antenna feeds are processed using matched filter techniques (correlation and integration). The filter does not need to know what type of signal it is looking for beforehand so it may be thought of a signal agnostic match filter (SAMF). The coherent processing gain is sufficient to detect and coarsely characterize the signal of interest. Channelizer bin frequency, coarse time of arrival (TOA), pulse width (PW) and amplitude are directly measured at the SAMF receiver ouput. Frequency and fine TOA are not available at the SAMF receiver output. However, by storing the channelizer output data, post-detection processing of the data from the detected bin at the coarse time of arrival allows for measurement of frequency characteristics (center frequency of a constant frequency pulse or center frequency and chirp slope of a linear frequency modulated (LFM) pulse) and fine time of arrival. A digital instantaneous frequency measurement (DIFM) algorithm disclosed in U.S. Pat. No. 7,236,901, the contents of which we incorporated herein by reference may be used to measure frequency and LFM characteristics. This has been observed with the DIFM making quality frequency measurements to SNRs as low as −6 dB in wideband applications at BAE Systems Inc. Now, knowing measures of amplitude, coarse time of arrival, pulse width and detailed frequency content, a signal template can be made for reuse in a matched filter to estimate the fine time of arrival.

The preferred embodiment is a system for detecting unknown signals. A system includes a receiver, a multiplier logic, an integrator logic and a peak detection logic. The receiver receives a first radio frequency (RF) input containing an unknown signal and first noise and a second RF radio input containing the same unknown signal and a second noise. The second RF input is orthogonally polarized with respect to the first RF input. The multiplier logic multiplies the first RF input with a conjugate of the second RF input to produce a multiplied signal. The integrator logic integrates the multiplied signal to product an integrated signal. The peak detection logic determines a coarse time of arrival (TOA) of a unknown signal located in the Integrated signal based, at least in part, on a peak power in the integrated signal.

Another configuration of the preferred embodiment is a signal agnostic matched filter (SAMF) for detecting unknown signals. The SAMF includes a first input line for receiving a first input that contains the unknown signal and a first noise and a second input line for receiving a second input with the unknown signal and a second noise. The first input is orthogonal to the second input. A first channel logic converts the first input into a plurality of first channels representing the first input and similarly a second channel logic converts the second input into a plurality of second channels of data representing the second input. A conjugate multiplier logic complex conjugate multiplies the plurality of first channels with the plurality of second channels to produce a plurality of multiplied channel data. An integrator integrates the plurality of multiplied channel data to produce a plurality of integrated channel data. Detection logic detects which of the plurality of integrated channel data contains the unknown signal and determines a coarse time of arrival (TOA) of the unknown signal.

Another configuration of the preferred embodiment is a method of detecting an unknown signal. The method begins by channelizing a first signal from a source that contains an unknown signal and a first noise. The first signal is channelized into a first plurality of channelized signals. Similarly, a second signal is received from the source also containing the unknown signal and second noise that is different than the first noise. The second signal is channelized into a second plurality of channelized signals. The second signal is orthogonal to the first signal. The first plurality of channelized signals and the second plurality of channelized signals are complex conjugate multiplied to produce a plurality of multiplied signals. The plurality of multiplied signals are then integrated to produce a plurality of integrated signals. A peak power is then found in one of the plurality of integrated signals. A time of arrival (TOA) of the unknown signal is determined in the integrated signal with the peak power.

Another embodiment includes a method for detecting unknown signals that may be radar pulses is presented. The method includes conjugate multiplying a first signal with a second signal to produce a first multiplied signal and conjugate multiplying the second signal with a third signal to produce a second multiplied signal. The first, second and third signals are orthogonal to each other. The radar pulse is contained in the first, second and third signals but these signals all have different noise components. The first multiplied signal is integrated to produce a first integrated signal and the second multiplied signal is integrated to produce a second integrated signal. The first and second integrated signals are summed to produce a summed signal. A location of a peak power of the summed signal is then detected in the summed signal. A TOA of the of the radar pulse is then detected based on the location of the peak power.

Another configuration of the preferred embodiment is a signal agnostic matched filter (SAMF) for detecting an unknown signal. The SAMF includes a first input line for receiving a first input that contains the unknown signal and a first noise and a second input line for receiving a second input with the unknown signal and a second noise where the first input is orthogonal to the second input. The SAMF further includes a third input line for receiving a third input with the unknown signal and a third noise. The third input is orthogonal to the second input. A first conjugate multiplier logic complex conjugate multiplies the first input with the second input to produce a first multiplied data and a second conjugate multiplier logic complex conjugate multiplies the second input with the third input to produce a second multiplied data. A first integrator integrates the first multiplied data to produce a first integrated data and a second integrator integrates the second multiplied data to produce a second integrated data. A summation logic adds the first integrated data with the second integrated data to produce a summed data. Selection logic detects a location in the summed data that contains the unknown signal and determines a coarse time of arrival (TOA) of the unknown signal.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
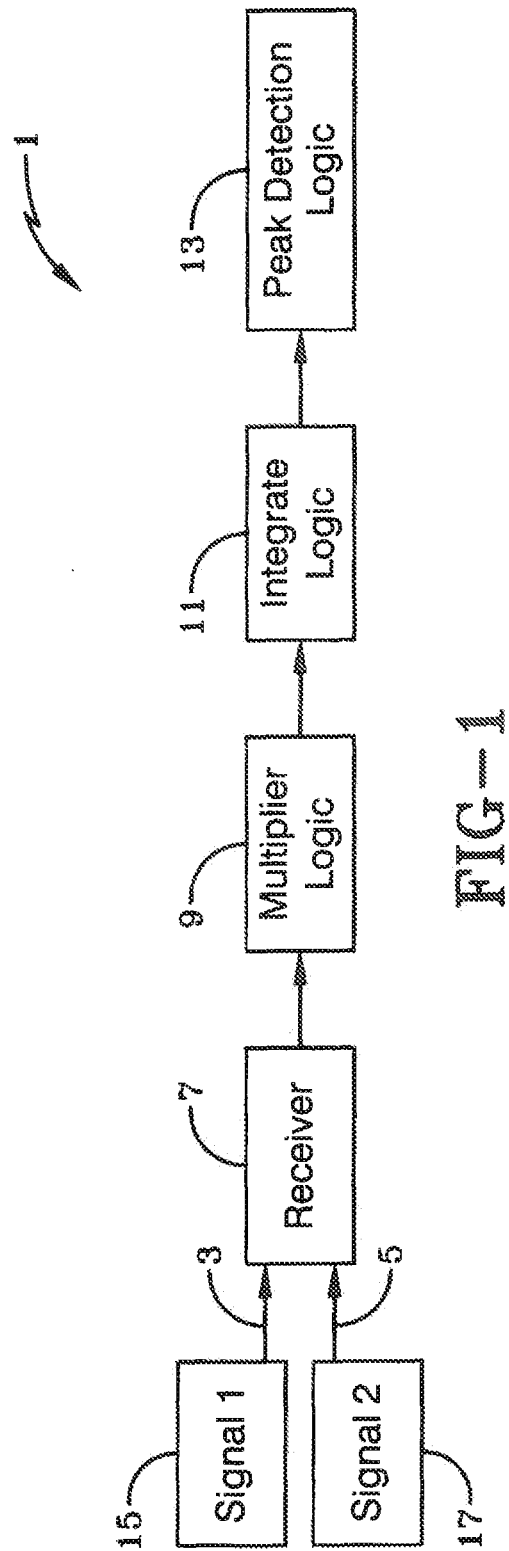
FIG. 1 illustrates a preferred embodiment of a system for detecting unknown signals.

FIG. 1 illustrates the preferred embodiment of a radar detection system 1 for detecting a modern radar. While FIG. 1 is described with reference to detecting modern radar, it is to be understood that FIG. 1 and preferred embodiment are more broadly direct toward a signal agnostic matched filter (SAMF) that can possibly detect any type of signal in any possible environment and/or application. The SAMF can detect the signal as discussed below without actual needing to construct the signal itself.

Modern radars are good at hiding their signals or pulses so that they can be very hard to detect. For example, radar systems can use spread spectrum techniques to modulate their pulses. Additionally, they use a lot less power than older radars which further makes their signals harder to detect. The system 1 Includes a first input line 3, a second input line 5, a receiver 7, a multiplier logic 9, a integrate logic 11 and a peak detection logic 13. In the preferred embodiment (with the possible exception of the first and second input lines 3, 5 and the receiver 7) everything in FIG. 1 is preferably implemented in digital logic.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The radar detection system 1 of FIG. 1 uses a signal agnostic matched filter (SAMF) type of parameter estimator to detect a radar signal. This is because as discussed in further detail below the radar detection system 1 does not care what type of radar signal it is looking for. The signal it is looking to find could be a fixed frequency signal, a swept frequency pulse type of signal, a phase modulated pulse such as a binary phase shift keyed signal or another type of signal.

Having described the components of the system 1, its use and operation will now be described. The system 1 of FIG. 1 receives a first signal 15 at input line 3 from an antenna that is polarized one way and receives a second signal 17 at the second input line 5 that is orthogonally polarized with respect to the first signal 15. Both the first and second signals 15, 17 will contain the same signal because they are received at the same time but they will contain different noise. For example, a circularly polarized received signal will have the same signal amplitude and a constant phase shift when comparing the outputs of two linear polarized antennas. Similarly, a linearly polarized received signal will have the same signal amplitude and a constant phase shift when comparing the outputs of two circularly polarized antennas.

The system 1 takes both of these signals 15, 17 and complex conjugate multiplies them in the multiplier logic 9. Because the noise is different on the first signal 15 and the second signal 17 they will generally cancel each other out when the conjugate of one signal is multiplied with the other signal and integrated. The actual wanted radar signals in both the first signal 15 and the second signal 17 are the same so they combine (are added together) to make this signal easier to detect. One may think of the first signal 15 acting as a signal onto which the other second signal 17 is matched using more traditional matched filter techniques that match an unknown signal to a replica of a pre-known signal. However, the radar detection system of FIG. 1 does not match to a pre-known signal. Being more robust than a traditional system, the radar detection system 1 of FIG. 1 can detect essentially any type of radar pulse that is modulated in essentially any way and it can still detect the radar pulse without knowing what it looks like and it can do this without using a pre-known pulse or its characteristics.

The integrate logic 11 then integrates the output of the multiplier over a time period. As discussed below in more detail, the integration can be over a short, medium and/or long time period in order to detect radar pulses of different widths. However, in this broad embodiment, the integrate logic 11 integrates the multiplication product over at least one time length to produce an integrated signal.

The detection logic 13 can then take the integrated signal and perform a peak power detect. The peak power can be detected using any method as understood by one of ordinary skill in the art. For example, the peak power can be detected when a leading edge of the integrated signal moves above a threshold value and its trailing edge falls below that threshold value. The peak power can be estimated between these two and the edges and can be based on the amplitude of the signal between them.

Figure 2:
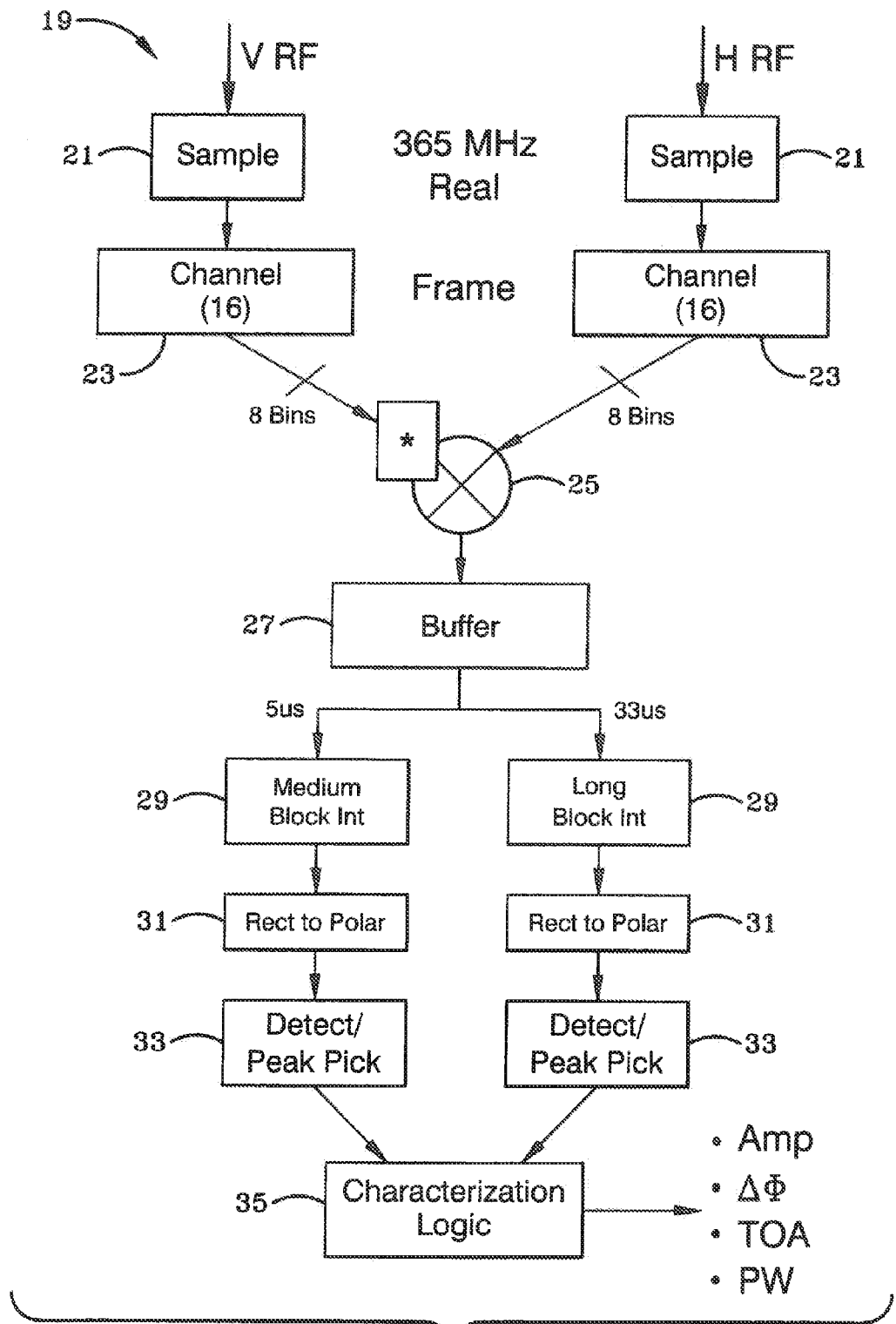
FIG. 2 is a schematic drawing showing another configuration preferred embodiment of a system for detecting signals.

FIG. 2 illustrates another configuration of the preferred embodiment with a few more details. The radar detection system 19 of this figure is another embodiment of the signal agnostic match filter (SAMF) of FIG. 1. This system for detecting radar 19 includes samplers 21 that are connected to channels 23 that may be thought of as channelizers. In other embodiments the samplers 19 can sample inputs that are radio frequency (RF) signals to produce a stream of digital samples. The outputs of the channels are input to a conjugate multiplier 25 with its output connected to an optional buffer 27. The output of the buffer 27 then proceeds through two parallel integration paths that each include an integrator 29, followed by a rectangular to polar logic 31 and a detect/peak pick logic 33 with the outputs of the detect/peak pick logic 33 input to a characterization logic 35. Every component in FIG. 2 can be implemented in digital logic in a semiconductor chip and/or programmed into an adequately sized FPGA (field programmable gate array).

Having described the components of the radar detection system 19 of FIG. 2, its use and operation is now discussed. Similar to the preferred embodiment of FIG. 1, the radar detection system 19 of FIG. 2 receives two orthogonal electromagnet radio frequency (RF) inputs. Here, a vertical radio frequency (V-RF) and a horizontal RF (H-RV) are illustrated. However, other orthogonal inputs can be used. The inputs should both contain the same radar signal but contain different noise. The inputs are each sampled and stored by the samplers 21. The inputs may be sampled at 365 MHz or another suitable frequency.

The channels 23 essentially act as channelizing logic that converts the sampled data into 16 channels. In some implementations, a Fast Fourier Transform (FFT) can be used to channelize the V-RF signal and the H-RF signals. The channel/channelizing logic 23 (FFT logic) acts similar to a bank of band-pass filter that are arranged shoulder-to-shoulder to essentially break up the noise into different channels so the noise is spread across several channels. Even though the noise is spread into 16 channels, the signal is located in one (or sometimes two) of the channels so that the radar signal does not get broken up. This improves the signal to noise ratio (SNR) across the channels.

Channalized portions of the sampled signal are taken two at a time and conjugate multiplied in the multiplier 25. The multiplication output can be stored in a buffer 27. However, the buffer 25 is not necessary and in other configurations the output from the multiplier 25 can be passed directly into the integrators 29.

After the multiplication, the shape of the radar pulse is still unknown, its frequency is still unknown, and if there is modulation on the frequency is unknown. Because the length of the radar pulse (signal) is unknown two different integration times are used to integrate the conjugate multiplied signal in each of the integrators 29. In other configurations, the multiplied signals could be integrated one or even three or more times rather than just the two times illustrated in FIG. 2. For example, in another configuration the conjugate multiplied signal could be integrated with a short period of 100 ns in addition to (as shown in FIG. 2) a medium period of 5 us and a long period of 33 us. Ideally the integration times would be matched to the type of radar (or another unknown signal) that is being looked for. However, if the pulse of the radar is unknown different integration times could be used and times other than what is shown in FIG. 2 can be used. The different integration lengths help to ensure that the integration does not integrate the signal down into the noise resulting in it being lost. In this embodiment, the medium (5 us) integration is illustrated as being performed in parallel with the long integration (33 us); however, in other configurations these two integrations may be performed in series one after the other in a cascade approach.

The integration essentially adds up complex numbers to create a series of other complex numbers in rectangular form. Therefore, at the conclusion of the integrations their results are converted to polar coordinates by the rectangular to polar logic 31 so that the integrated signals are now in phase and magnitude format. To facilitate the finding of the radar signal peak (power) these polar coordinates are input to the detect/peak detectors 33 where any peak detect algorithm can be used to find the peak power. Any peak detection algorithm as understood by one of ordinary skill in the art could be used. For example, the detect/peak pick 33 could detect leading and trailing edges of a pulse and use the distance between them to estimate its pulse width. After all of the pulses have been analyzed for power, the detect/pick peak logic 33 would select one with the maximum power.

The one with the maximum power along with other information about its waveform is then presented to the characterization logic 35. Once the pulse width is detected, its leading edge would correspond to a coarse time of arrival (TOA). The characterization logic 35 would also calculate other characteristics such as phase difference, pulse width, and maximum amplitude. For example, the phase can be calculated in the rectangular to polar conversion (logic 31) of the best matched polar coordinates and the pulse width might be based on the length between the leading and trailing edges.

Figure 3:
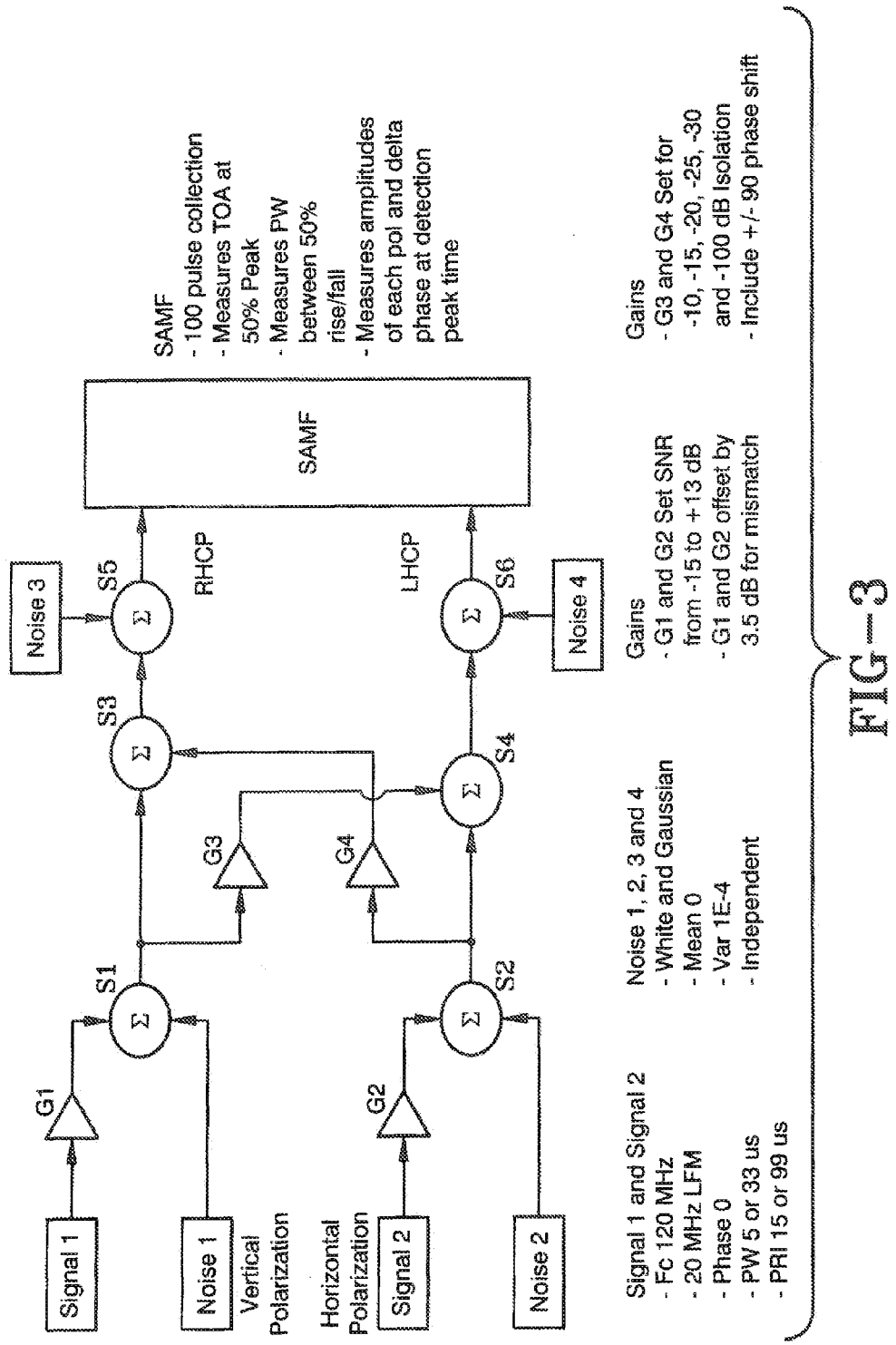
FIG. 3 is a schematic drawing showing gain mismatch and cross-pol isolation simulation used in running simulation of the preferred embodiment.

FIG. 3 illustrates an actual simulation of generating a signal with differing noise in each input for simulating the orthogonal inputs of FIG. 1. This simulation was actually performed at BAE Systems; Inc. before they built working versions of an actual SAMF based radar detection system. Signals 1 and 2 are input as shown and are the same signals modeling a radar signal to be detected by the SAMF. Noise 1, 2, 3, and 4 are also input as shown with the parameters specified in FIG. 3. The signals and noise propagate through gain devices G1-4 as well as summing devices S1-S6 as shown and specified in the figure.

Figure 4:
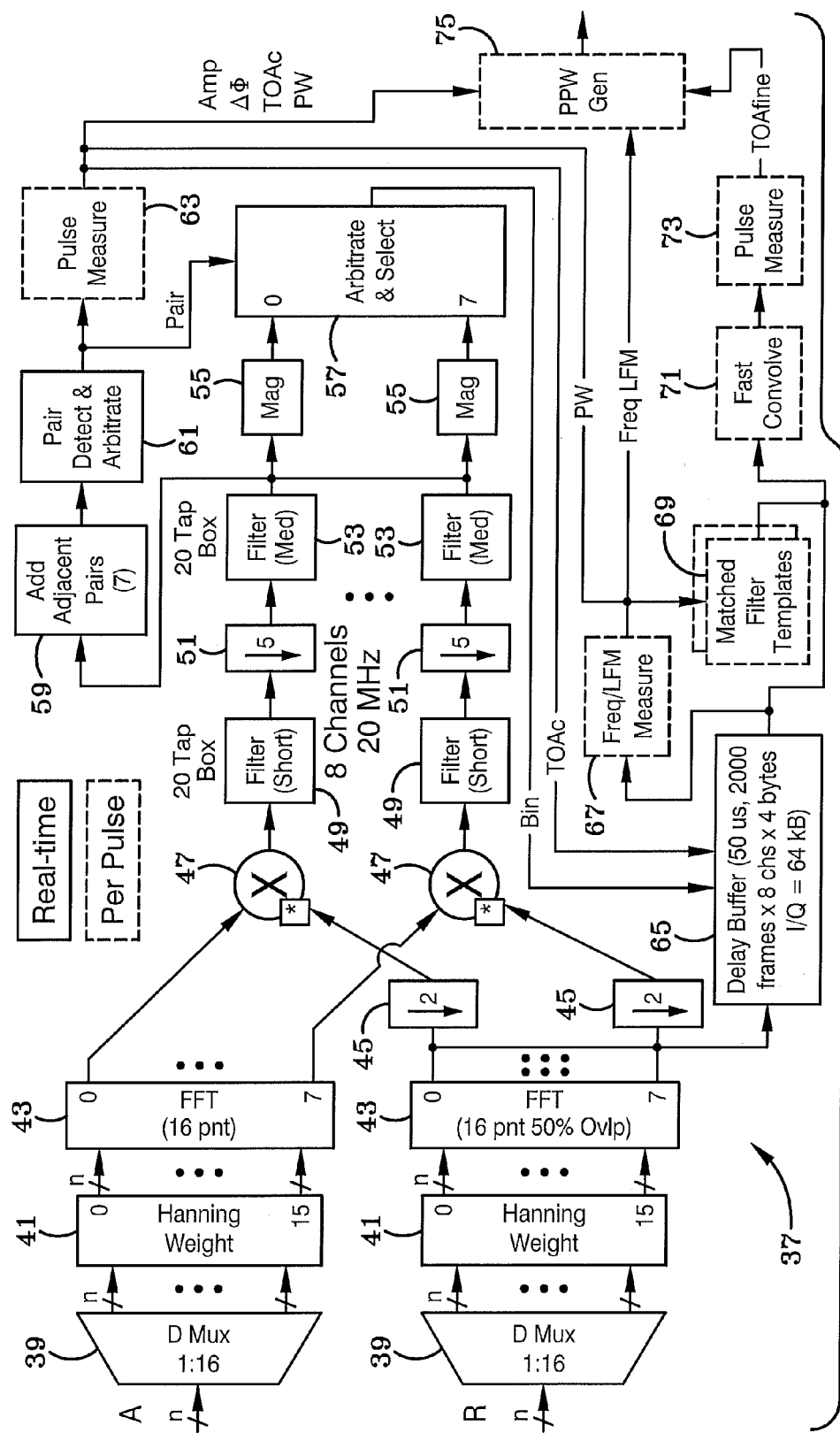
FIG. 4 is a schematic drawing showing a SAMF with components for frequency and fine TOA measurement in a configuration of the preferred embodiment.

FIG. 4 illustrates another radar detection system 37 that includes some enhancements to the radar detection systems 1, 19 discussed above. For example the radar detection system 37 of FIG. 4 still detects a time of Arrival (TOA) as discussed above but then pulls real time data of the original signal from a bin and performs a fast convolution on it to improve on finding a more accurate TOA. TOA error is one of the most important parameter measurements. It is often used to calculate the location of an enemy radar so it is important for systems that target that enemy.

The radar detection system 37 includes input lines R and A. For example these input lines may receive a right circular signal and left circular signal of a circularly polarized signal. For example, left and right circular signals may be best used when looking for linear radar signals. These signals are each respectively digitized and accumulated and then passed through 1-to-16 de-multiplexers 39. They are passed from the de-multiplexers 39 into weight logic 41 where a Hanning weight is applied to them to begin channelizing them before they are passed to channelization logic 41. The channelization logic 43 separates the signals into eight different channels. For example, the weighted Hanning signals can then be passed through a FFT as discussed above to complete channelization so that each channel is 20 MHz each. One of the two signal streams is then down sampled by two with down samplers 45. Next, the channelized signals are complex conjugate multiplied by complex conjugate multipliers 47.

The multiplied signals are then serially passed through a short filter (integrator) 49, a factor of five down sampler 51, a medium filter (integrator) 53 and a magnitude block 55 before the outputs of the magnitude block 55 are input to an arbitrator and selector 57. It is not shown here but there could be another down sampler after the filter followed by a long integrator before reaching the arbitrator and selector 57. In FIG. 4 the arbitrator and selector 57 uses the output of the medium filter (5 us for example) to select which bin has the largest amount of power. In other embodiments, the outputs of the short filter and/or long filter could also be used in detecting amplitudes of other possible sizes of pulses.

This radar detection system 37 additionally adds adjacent pairs (from the medium filters) in an adjacent pair logic 59 to get more gain when spread spectrum radar signals span two adjacent frequency bins. The wanted signal will add coherently and the noise will not. Adding adjacent pairs helps to find a signal that is centered about the edges of two different adjacent bins. This helps to find linear frequency modulated signals that often may sweep across two channels (bins) so that part of its content is in two channels/bins. If only one channel were used to find amplitude then part of the amplitude in the other channel is unused unless these adjacent channels are added. The pair detect and arbitrate logic 61 analyses these added pairs from two different channels and determines and signals the arbitrate and select logic 57 when it is to use an added pair rather than an amplitude based on a single channel. Pulse measurement logic 63 then finds the pulse and determines a coarse TOA. As discussed above any pulse detection method may be implemented.

Figure 5:
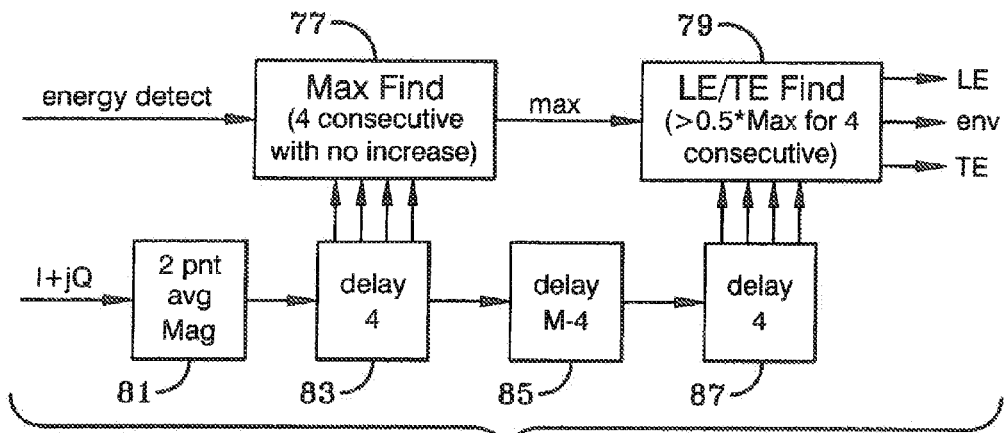
FIG. 5 illustrates some example components used to characterize a pulse of a signal.

FIG. 5 illustrates some of the components of one way the pulse measurement logic 63 may use to determine the leading edge and the trailing edge of a pulse. An energy detect signal (similar to magnitude outputs of the magnitude blocks 55 of FIG. 4) are input to maximum find logic 77. The output of the maximum find logic 77 is input a leading edge/trailing edge detector 79 that finds the leading edge (LE) and the trailing edge (TE). The real and imaginary portions (I+jQ) of the integrated signal are input to an average logic that averages two magnitude values. This average is then sent through a series of delay blocks 83, 85, 87 where it is input to the maximum find logic 77 and the leading edge/trailing edge detector 79.

Returning to FIG. 4, after arbitrator and selector 57 knows the correct bin and the coarse TOA is has been determined by the pulse measurement logic 63, this information can be used to access a delay buffer 65 that has earlier stored channalizer samples. The delay buffer 65 is accessed to extract the sample corresponding to the bin that the arbitrator and selector 57 has determined has the highest power. After this sample is accessed, its instantaneous frequency within a pulse can then be more accurately determined by a frequency measurement logic 67. Preferable a sequence of frequency measurements are made. Now, the frequency, coarse TOA, pulse width (PW) and chirp slope are known. The frequency measurement logic 67 may be, for example, based on a digital instantaneous frequency measurement (DIFM) algorithm as disclosed in U.S. Pat. No. 7,236,901.

Figure 7:
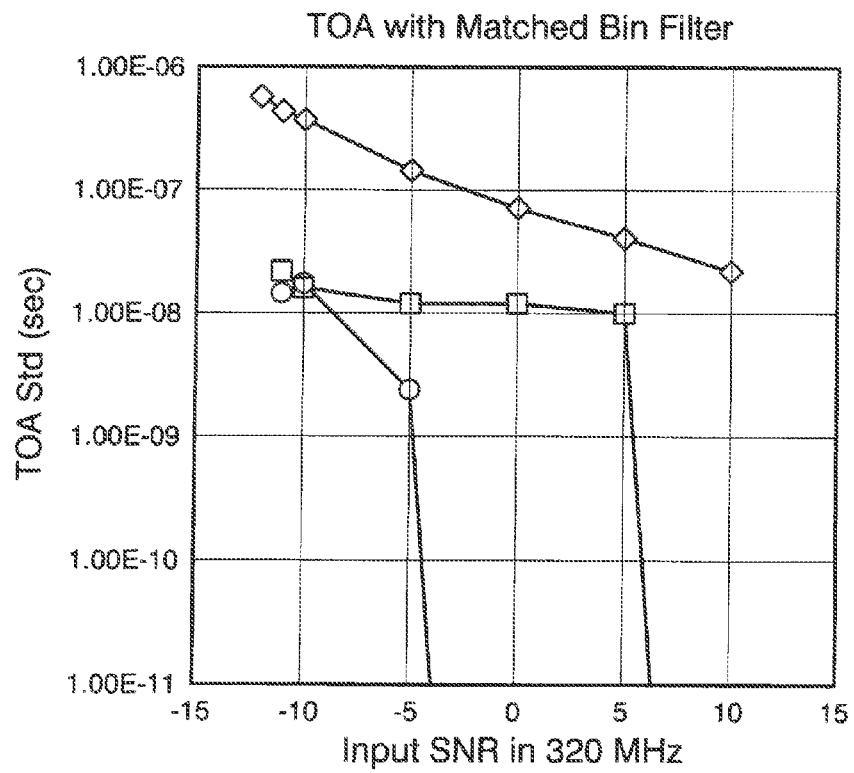
FIG. 7 is a graph showing fine TOA measurement using a measured parameter signal template.
Figure 6:
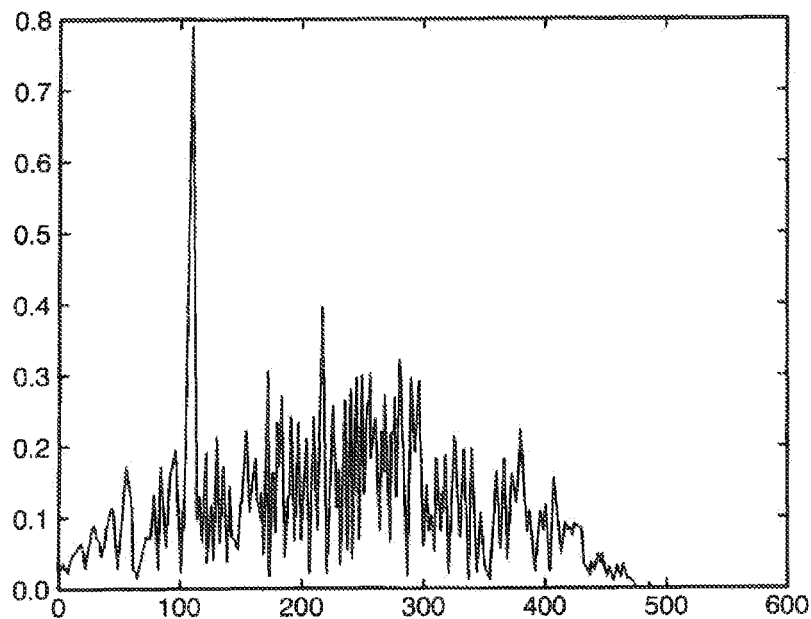
FIG. 6 are graphs showing fine matched filter output magnitude in the preferred embodiment of the invention.
Figure 6:
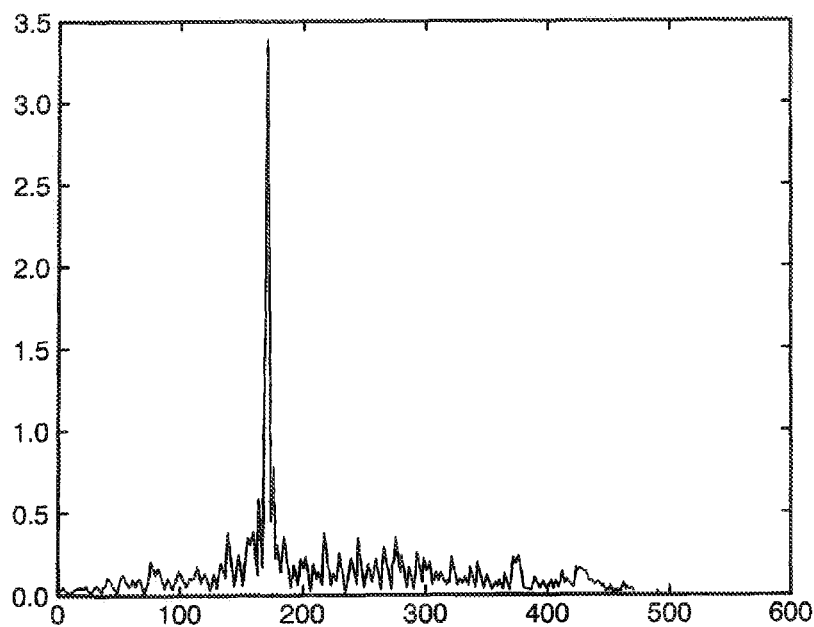

The frequency, coarse TOA, PW and chirp slope are used to create a matched filter template by the matched filter template logic 69. In the preferred embodiment more than one pulse is processed by the conjugate multiplier 47 and filters 49, 53 to create multiple templates. For example, two, three, for or more pulse templates can be created when multiple radar signals are present. A fast convolve logic 71 convolves the matched filter template stored in the matched filter template logic 69 with the corresponding channelized sample history stored in the delay buffer 65. In other embodiments, other ways of correlating these two samples could be used. These results are then used to perform a more accurate pulse measurement in the pulse measurement logic 73 to generate a much more accurate fine TOA. The fine TOA, pulse frequency, amplitude, phase difference, coarse TOA and PW are input to a PPW generator 75 wherein these signal parameters are packaged into a report. The sample fast convolution results of an actual simulation are shown in FIG. 6. The convolution peak is only one time offset wide and the fine TOA clearly detected. FIG. 7 illustrates the coarse TOA vs. the Input SNR and the matched filter TOA (linear FM pulse sweeping from bin center to center (c-c) or sweeping around one bin center) for the same simulation.

Figure 8:
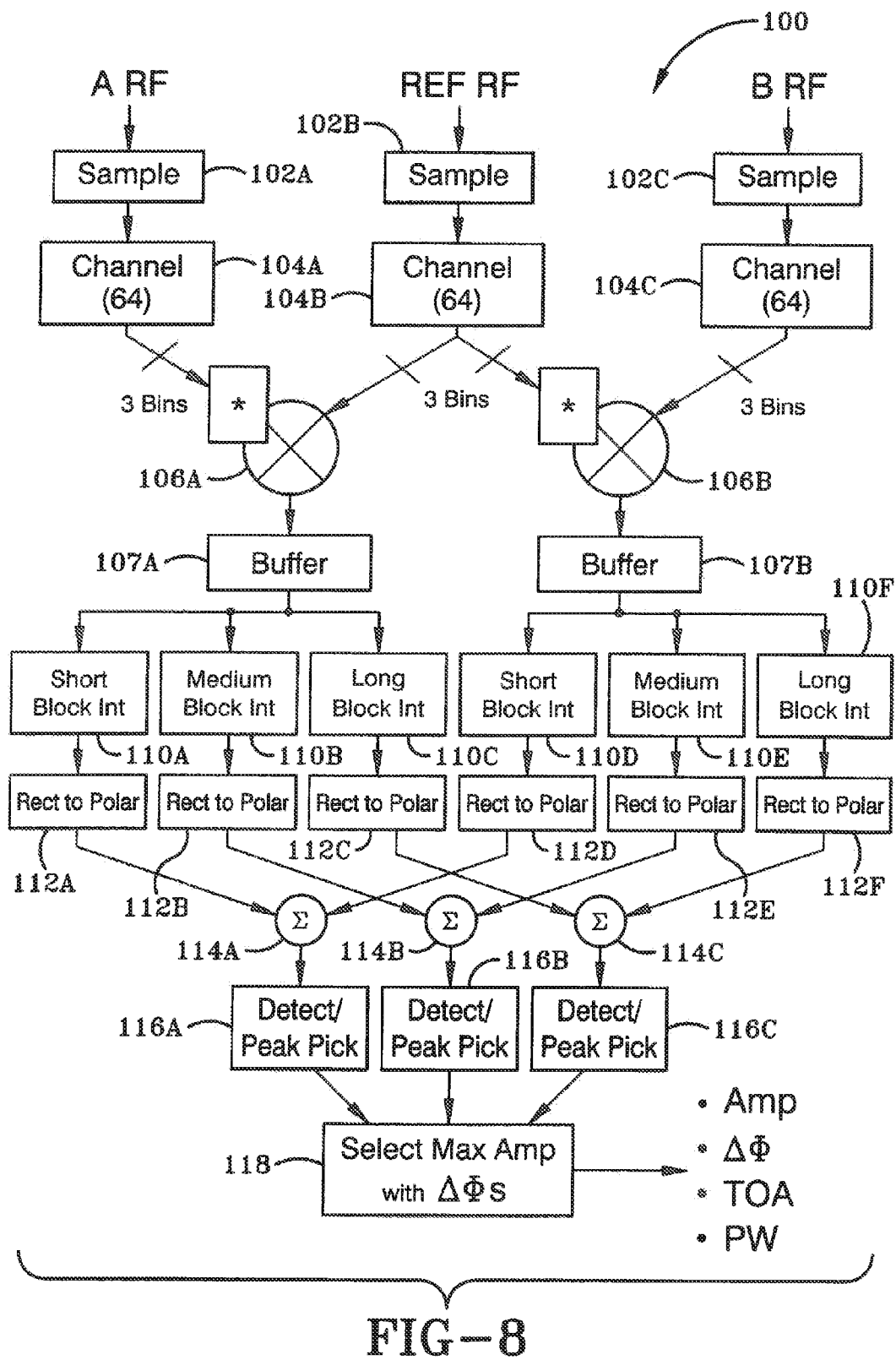
FIG. 8 is a schematic drawing showing another configuration preferred embodiment of a system for detecting signals that uses three orthogonal signals.

FIG. 8 illustrates another configuration of the preferred embodiment for detecting a radar that uses three orthogonal inputs. The radar detection system 100 of this figure is another embodiment of the signal agnostic match filter (SAMF) of FIG. 1. This system 100 receives three signals A RF, B RF and Ref RF that are orthogonal to each other and are radio frequency (RF) signals. In a multi-arm spiral antenna, there are different modes that can be derived that are orthogonal so Ref RF could be right hand circular polarization (RHCP) mode 2, A RF could be Left hand circular polarization (LHCP) mode 2 and B RF could be RHCP mode 3. Hence, ref RF will be orthogonal to both A RF and B RF.

The system 100 processes these three signals in pairs to gather more information about the original signal which provides for a more sensitive and robust system that produces a more accurate TOA output. By taking two pairs of orthogonal channels through a signal processing process two pairs at a time, the receive sensitivity is increased by 3 db. In addition and as discussed below, the system 100 uses three integration times (short, medium and long) to integrate each pair to search for different pulse widths.

This system 100 for detecting radar includes samplers 102A-C that are connected to channels 104A-C that may be thought of as channelizers. The outputs of the channels 104A and 104B that correspond to the channelized A RF input and the channelized Ref RF input are respectively input into conjugate multipliers 106A and the outputs of the channels 104B and 104C that correspond to the channelized Ref RF input and the channelized B RF input are respectively input into conjugate multipliers 106B. The outputs of the conjugate multipliers 106A-B are input to optional buffers 107A-B.

The outputs of each of the buffers 107A-B then proceeds through three parallel integration paths to form six parallel integration paths total. As illustrated, each integration path includes one of six integrators 110A-F followed by a corresponding rectangular to polar logics 112A-F. Integrators 110A and 110D integrate over short integration times that may be, for example, about 0.12 us. Integrators 110B and 110E integrate over medium integration times that may be, for example, about 5 us while integrators 110C and 110F integrate over long integration times that may be, for example, about 33 us. Integrating over different period aids in finding different pulse widths in a signal. The rectangular to polar logic 112A-F converts rectangular formatted data into polar formatted data.

The outputs of rectangular to polar logic 112A-F are input into summation logic 114A-C wherein pairs of data are added together. The outputs of integration that where integrated over the same interval are input into the same summation logic and combined into one value. For example, the output of the two short interval integrators 110A, 110D are summed in summation logic 114A after passing through their corresponding rectangular to polar logic 112A, 112D. Similarly, the output of the two medium interval integrators 110B, 110E are eventually summed in summation logic 114B and the output of the two long interval integrators 110C, 110F are eventually summed in summation logic 114C.

The output of each summation logic 114A-C is each respectively output into a respective detect/peak pick logic 116A-C as illustrated. The outputs of the detect/peak pick logic 116A-C are each input to a selection logic 118. Every component in FIG. 2 can be implemented in digital logic in a semiconductor chip and/or programmed into an adequately sized FPGA (field programmable gate array).

Having described the components of the radar detection system 100 of FIG. 8, its use and operation is now discussed. As previously mentioned, the radar detection system 100 of FIG. 8 receives three orthogonal electromagnetic radio frequency (RF) inputs. All three inputs contain the same radar signal but contain different noise. The inputs are each sampled and stored by the samplers 102A-C. The inputs may be complex digital samples and may be sampled at about 4400 MHz or another suitable frequency.

The channels 114A-C essentially act as channelizing logic that converts the sampled data into 16 channels. In some implementations, a Fast Fourier Transform (FFT) can be used to channelize the A RF, ref RF and B RF signals. The channel/channelizing logic 114A-C acts similar to a bank of bandpass filter that are arranged shoulder-to-shoulder to essentially break up the noise into different channels so the noise is spread across several channels. Even though the noise is spread into 16 channels, the signal is located in one (or sometimes two) of the channels so that the radar signal does not get broken up. This improves the signal to noise ratio (SNR) across the channels.

Channelized portions of the sampled signal are taken two at a time and conjugate multiplied in each of the multipliers 106A, 106B. The multiplication output can be stored in corresponding buffers 107A-B. However, the buffers 107A-B are not necessary and in other configurations the output from the multiplier 114A-B can be passed directly into the integrators 110A-F.

As discussed above with reference to FIG. 2, after the multiplication the shape of the radar pulse is still unknown, its frequency is still unknown, and if there is modulation on the frequency is unknown. Because the length of the radar pulse (signal) is unknown three different integration times are used to integrate the conjugate multiplied signal in each of the integrators 110A-F. Therefore, each pair of signals are integrated by three different integrators over short, medium and long periods with all six (three for each pair of signals) of these integrations performed in parallel as illustrated. As mentioned earlier, the conjugate multiplied signals could be integrated with a short period of 100 ns, a medium period of 5 us and a long period of 33 us. Ideally the integration times would be matched to the type of radar (or another unknown signal) that is being looked for. However, if the pulse of the radar is unknown different integration times could be used and times other than what is shown in FIG. 8 can be used.

Similar to the implementations discussed above, the integration essentially adds up complex numbers to create a series of other complex numbers in rectangular form. Therefore, at the conclusion of the integrations their results are converted to polar coordinates by the rectangular to polar logics 112A-F so that the integrated signals are now in phase and magnitude format. To take advantage processing three pairs of orthogonal signals in series, pairs of integrated signals are combined in corresponding summation logics 114A-C. This adds about 3 db of gain that the systems discussed above are unable to attain because they only operate on a single pair of orthogonal signals.

To facilitate the finding of the radar signal peak (power) the three pairs of summed polar coordinates are input to the detect/peak detectors 116A-C where any peak detect algorithm can be used to find the peak power of each of the short, medium and long integrated signals. Any peak detection algorithm as understood by one of ordinary skill in the art could be used. For example, the peak detection logic 116A-C could detect leading and trailing edges of a pulse and use the distance between them to estimate its pulse width. After all of the pulses in each signal stream have been analyzed for power, each the peak detection logics 116A-C would select one with the maximum power.

Each peak (from each of the short, medium and long integration paths) is then presented to the selection logic 118. The selection logic 118 determines which of the three peaks is the real peak of interest based on its power as compared to the other two. This peak and its pulse width is then selected. Once the pulse width is detected, its leading edge would correspond to a time of arrival (TOA). The selection logic 118 may also calculate other characteristics such as phase difference, pulse width, and maximum amplitude.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
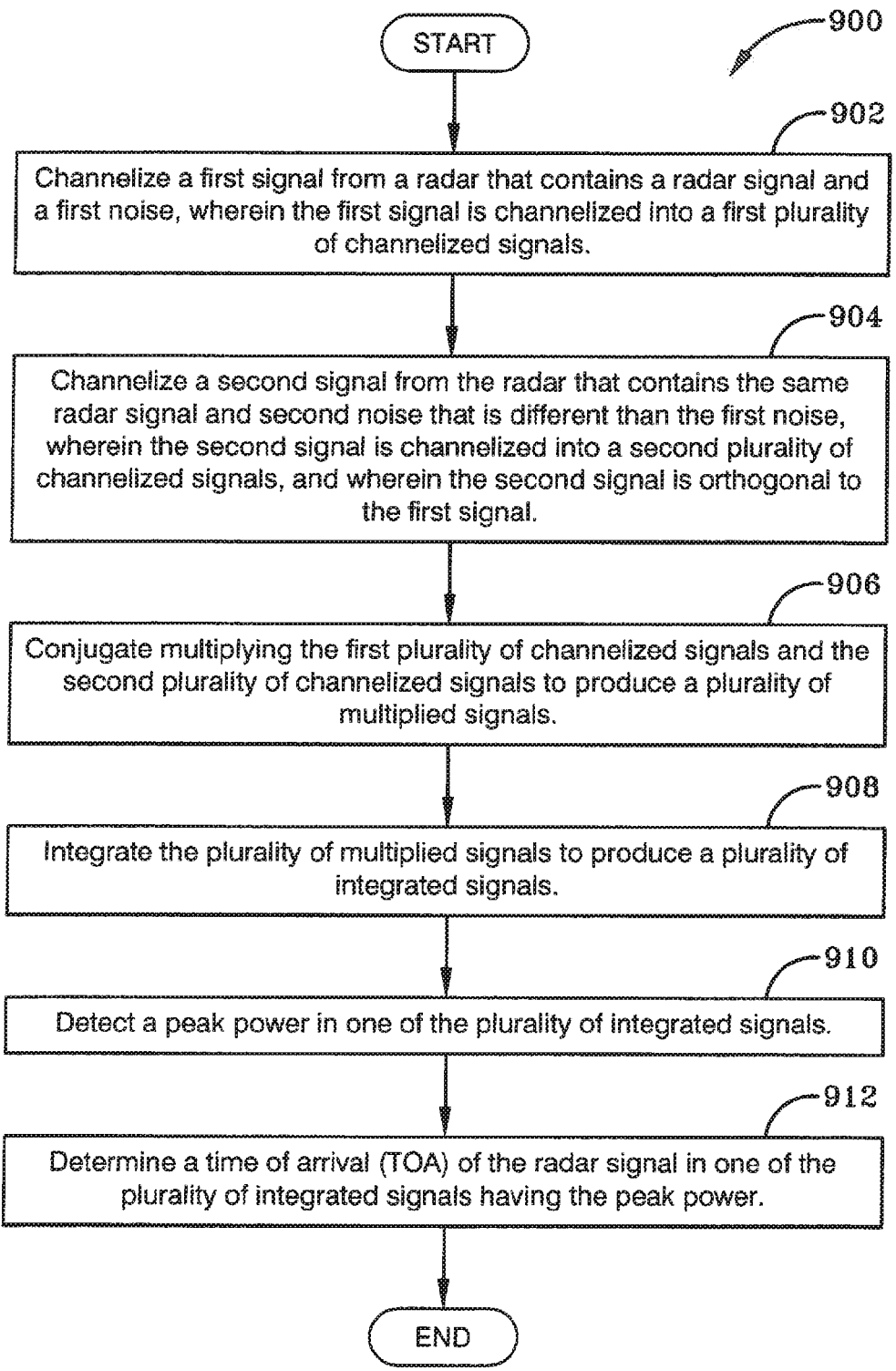
FIG. 9 illustrates an embodiment of a method for detecting a signal.

FIG. 9 illustrates a method 900 of detecting a radar. Of course, this method 900 could also detect any unknown signal that is not necessarily a radar signal. The method begins, at 902, by channelizing a first signal from the radar that contains a radar signal and a first noise. The first signal is channelized into a first plurality of channelized signals. Similarly, the method 900 channelizes a second signal from the radar, 904. The second signal contains the same radar signal and second noise that is different than the first noise. The second signal is channelized into a second plurality of channelized signals. The second signal is orthogonal to the first signal.

The first plurality of channelized signals and the second plurality of channelized signals are complex conjugate multiplied, at 906, to produce a plurality of multiplied signals. The plurality of multiplied signals are then integrated to produce a plurality of integrated signals, at 908. A peak power in one of the plurality of integrated signals is determined, at 910. A time of arrival (TOA) of the radar (or unknown) signal with the peak power is determined to be one of the plurality of signals, 912.

Figure 10:
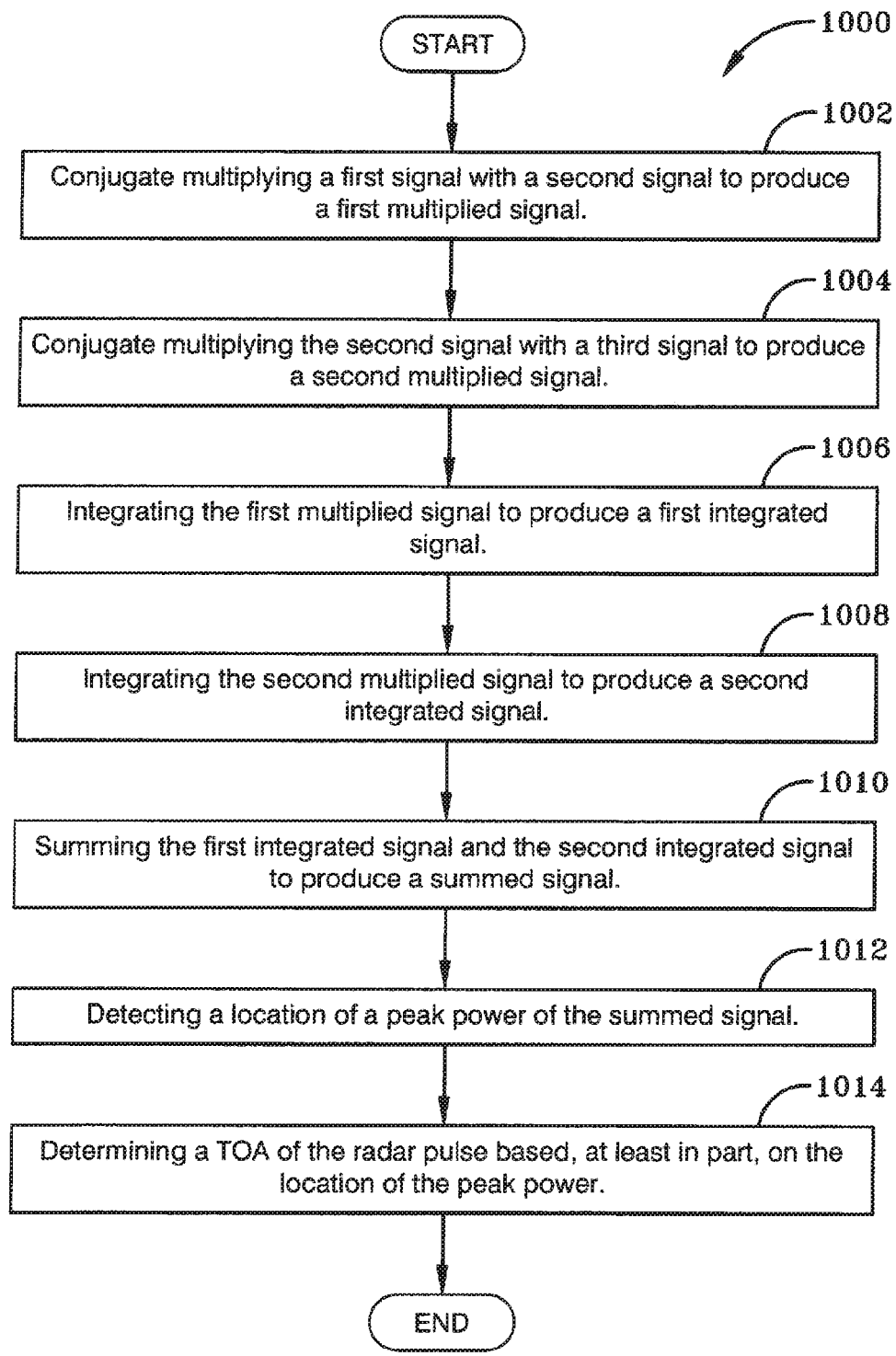
FIG. 10 illustrates an embodiment of another method for detecting a signal.

FIG. 10 illustrates another example method 1000 of detecting a radar pulse in a signal. Similar to FIG. 8 discussed above, this method 1000 uses three orthogonal signals to determine a more accurate TOA of a radar pulse than using two orthogonal signals. The method 1000 begins by conjugate multiplying a first input signal with a second input signal, at 1002, to produce a first multiplied signal. The first input signal is orthogonal to the second input signal and the radar pulse is contained in the first input signal and the second input signal, however, the first input signal and the second input signal have different noise. Similarly, the method 1000, at 1004, conjugate multiplies the second input signal with a third input signal to produce a second multiplied signal. The second input signal is orthogonal to the third input signal and the radar pulse is contained in the second and third input signals and the second and third input signals have different noise.

The first multiplied signal is integrated, at 1006, to produce a first integrated signal and the second multiplied signal is integrated, at 1008, to produce a second integrated signal. The first integrated signal and the second integrated signal are summed, at 1010, to produce a summed signal. A location of a peak power of the summed signal is then determined, at 1012. Any method of determining the peak power of a signal as understood by one of ordinary skill in the art can be used to determine the peak power. A TOA of the of the radar pulse is determined, at 1014, based, at least in part, on the location of the peak power.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

The invention claimed is:

1. A signal agnostic matched filter (SAMF) for detecting an unknown signal comprising:
    a first input line configured to receive a first input that contains the unknown signal and a first noise;
    a second input line configured to receive a second input with the unknown signal and a second noise, wherein the first input is orthogonal to the second input;
    a third input line configured to receive a third input with the unknown signal and a third noise, wherein the third input is orthogonal to the second input;
    a first conjugate multiplier logic configured to complex conjugate multiply the first input with the second input to produce a first plurality of multiplied data;
    a second conjugate multiplier logic configured to complex conjugate multiply the second input with the third input to produce a second plurality of multiplied data;
    a first integrator configured to integrate the first plurality of multiplied data to produce a first plurality of integrated data;
    a second integrator configured to integrate the second plurality of multiplied data to produce a second plurality of integrated data;
    a summation logic configured to sum the first plurality of integrated data with the second plurality of integrated data to produce a plurality of summed data; and
    selection logic configured to detect a location in the plurality of summed data that contains the unknown signal and to determine a time of arrival (TOA) of the unknown signal.

2. The SAMF for detecting an unknown signal of claim 1 further comprising:
    a first channel logic configured to convert the first input into a first plurality of channels representing the first input;
    a second channel logic configured to convert the second input into a second plurality of channels representing the second input;
    a third channel logic configured to convert the third input into a third plurality of channels representing the third input, wherein the first conjugate multiplier logic is configured to complex conjugate multiply the first plurality of channels with the second plurality of channels to produce the first plurality of multiplied data, and wherein the second conjugate multiplier logic is configured to complex conjugate multiply the second plurality of channels with the plurality of third channels to produce the second plurality of multiplied data.

3. The SAMF for detecting an unknown signal of claim 2 wherein the first channel logic is configured to convert the first input into 16 channels, wherein the second channel logic is configured to convert the second input into 16 channels and wherein the third channel logic is configured to convert the third input into 16 channels.

4. The SAMF for detecting an unknown signal of claim 2 wherein the first channel logic further comprises:

a first Fast Fourier Transform (FFT) logic configured to perform an FFT on the first input to produce the first plurality of channels, wherein the second channel logic further comprises:
a second FFT logic configured to perform an FFT on the second input to produce the second plurality of channels, wherein the third channel logic further comprises:
a third FFT logic configured to perform an FFT on the third input to produce the third plurality of channels.

5. The SAMF for detecting an unknown signal of claim 2 wherein the first channel logic operates in parallel with the second channel logic and the second channel logic operates in parallel with the third channel logic.

6. The SAMF for detecting an unknown signal of claim 1 further comprising:
a first sampler configured to sample the first input that is a radio frequency (RF) signal into a first stream of digital samples;
a second sampler configured to sample the second input that is an RF signal into a second stream of digital samples;
a third sampler configured to sample the third input that is an RF signal into a third stream of digital samples, wherein the first conjugate multiplier logic is configured to complex conjugate multiply the first stream of digital samples with the second stream of digital samples to produce the first plurality of multiplied data, and wherein the second conjugate multiplier logic is configured to complex conjugate multiply the second stream of digital samples with the third stream of digital samples to produce the second plurality of multiplied data.

7. The SAMF for detecting an unknown signal of claim 1 wherein the first integrator is a first short integrator and is configured to integrate the first plurality of multiplied data to produce a first short integrated data, wherein the second integrator is a second short integrator and is configured to integrate the second plurality of multiplied data to produce a second short integrated data, wherein the a summation logic is a first summation logic configured to sum the first short integrated data with the second short integrated data to produce a plurality of summed short data; and further comprising:
a first medium integrator configured to integrate the first plurality of multiplied data to produce a first medium integrated data;
a second medium integrator configured to integrate the second plurality of multiplied data to produce a second medium integrated data;
a first long integrator configured to integrate the first plurality of multiplied data to produce a first long integrated data;
a second long integrator configured to integrate the second plurality of multiplied data to produce a second long integrated data;
wherein the first short integrator integrates the first plurality of multiplied data over a shorter interval than the first medium integrator, wherein the first medium integrator integrates the first plurality of multiplied data over a shorter interval than the first long integrator;
a second summation logic configured to add the first medium integrated data with the second medium integrated data to produce a plurality of medium summed data;
a third summation logic configured to add the first long integrated data with the second long integrated data to produce a plurality of long summed data; and wherein the selection logic is configured to detect which of the group of: the short summed data, the medium summed data and the long summed data that contain the unknown signal and to determine the TOA based, at least in part, on a location of the unknown signal in one of the group of: the short summed data, the medium summed data and the long summed data.

8. The SAMF for detecting an unknown signal of claim 7 further comprising:
a short peak detection logic configured to determine a location of a peak pulse of the short summed data based, at least in part, on a first peak power in the summed short data;
a medium peak detection logic configured to determine a location of a peak pulse of the medium summed data based, at least in part, on and a second peak power in the medium summed data;
a long peak detection logic configured to determine a location of a peak pulse of the long summed data based, at least in part, on a third peak power in the long summed data; and
wherein the selection logic is configured to determine the TOA based, at least in part, on at least one of the group of: the first peak power, the second peak power and the third peak power.

9. The SAMF for detecting an unknown signal of claim 7 wherein the first short integrator integrates the first plurality of multiplied data over a same interval period that the second short integrator integrates the second plurality of multiplied data, wherein the first medium integrator integrates the first plurality of multiplied data over a same interval period that the second medium integrator integrates the second plurality of multiplied data, and wherein the first long integrator integrates the first plurality of multiplied data over a same interval period that the second long integrator integrates the second plurality of multiplied data.

10. The SAMF for detecting an unknown signal of claim 7 wherein first short integrator, the second short integrator, the first medium integrator, the second medium integrator, the first long integrator and the second long integrator are configured to operate in parallel.

11. The SAMF for detecting an unknown signal of claim 7 wherein the first summation logic provides at least 3 decibels of processing gain, wherein the second summation logic provides at least 3 decibels of processing gain, and wherein the third summation logic provides at least 3 decibels of processing gain.

12. The SAMF for detecting an unknown signal of claim 7 wherein the first short integrator provides at least 11 decibels of processing gain, wherein the first medium integrator provides at least 28 decibels of processing gain, and wherein the first short integrator provides at least 35 decibels of processing gain.

13. The SAMF for detecting an unknown signal of claim 1 further comprising:
a buffer configured to receive the first plurality of multiplied data and to buffer the first plurality of multiplied data before the first integrator receives the first plurality of multiplied data.

14. The SAMF for detecting an unknown signal of claim 1 further comprises:
a rectangular-to-polar logic configured to convert the first plurality of integrated data from rectangular to polar coordinates and to provide the first plurality of integrated data to the summation logic as polar coordinates.

15. The SAMF for detecting an unknown signal of claim 1 wherein the SAMF is implemented with digital logic.

16. The SAMF for detecting an unknown signal of claim 13 wherein the digital logic is implemented at least partly in silicon.

17. A method of detecting a radar pulse in a signal comprising:
conjugate multiplying, in an electronic processor, a first input signal with a second input signal to produce a first multiplied signal, wherein the first input signal is orthogonal to the second input signal and the radar pulse is contained in the first input signal and the second input signal, and wherein the first input signal and the second input signal have different noise;
conjugate multiplying, in the electronic processor, the second input signal with a third input signal to produce a second multiplied signal, wherein the second input signal is orthogonal to the third input signal and the radar pulse is contained in the third input signal, wherein the second input signal and the third input signal have different noise;
integrating, in the electronic processor, the first multiplied signal to produce a first integrated signal;
integrating, in the electronic processor, the second multiplied signal to produce a second integrated signal;
summing, in the electronic processor, the first integrated signal and the second integrated signal to produce a summed signal;
detecting a location of a peak power of the summed signal; and
determining, in the electronic processor, a time of arrival (TOA) of the radar pulse based, at least in part, on the location of the peak power.

18. The method of detecting a radar pulse of claim 17 further wherein the step of integrating the first multiplied signal integrates the first multiplied signal over a short period to produce a first short period integrated signal, wherein the integrating the second multiplied signal integrates the second multiplied signal over the short period to produce a second short period integrated signal, wherein the summing the first integrated signal and the second integrated signal produces a short period summed signal, wherein the detecting a location of a peak power of the summed signal detects a short period peak power of the summed signal, and further comprising:
integrating the first multiplied signal over a medium period that is longer than the first short period and the second short period to produce a first medium period integrated signal;
integrating the second multiplied signal over the medium period to produce a second medium period integrated signal;
integrating the first multiplied signal over a long period that is longer than the medium period to produce a first long period integrated signal;
integrating the second multiplied signal over the long period to produce a second long period integrated signal;
summing the first medium period integrated signal and the second medium period integrated signal to produce a medium period summed signal;
summing the first long period integrated signal and the second long period integrated signal to produce a long period summed signal;
detecting a medium period peak power of the medium period summed signal;
detecting a long period peak power of the long period summed signal; and
determining the TOA of the of the radar pulse based, at least in part, on one or more of the group of: the short period peak power, the medium period peak power and the long period peak power.

19. The method of detecting a radar pulse of claim 17 further comprising:
channelizing a first sampled radio frequency (RF) signal to produce the first signal that is a digital channelized signal;
channelizing a second sampled RF signal to produce the second signal that is a digital channelized signal; and
channelizing a third sampled RF signal to produce the third signal that is a digital channelized signal.

20. The method of detecting a radar pulse of claim 17 wherein the method detects the radar signal from the first integrated signal and the second integrated signal without determining an actual radar pulse value.

* * * * *